United States Patent [19]

Vdoviak et al.

[11] Patent Number: 4,733,538
[45] Date of Patent: Mar. 29, 1988

[54] COMBUSTION SELECTIVE TEMPERATURE DILUTION

[75] Inventors: John W. Vdoviak, Marblehead; Barry Weinstein, Georgetown, both of Mass.

[73] Assignee: General Electric Company, Lynn, Mass.

[21] Appl. No.: 232,924

[22] Filed: Feb. 9, 1981

Related U.S. Application Data

[63] Continuation-in-part of Ser. No. 947,919, Oct. 2, 1978, abandoned.

[51] Int. Cl.[4] .............................................. F02C 1/00
[52] U.S. Cl. ...................................... 60/752; 60/39.75
[58] Field of Search ................ 60/752, 39.75, 39.83, 60/755, 756, 757, 758, 759, 760; 415/116

[56] References Cited

U.S. PATENT DOCUMENTS

| | | | |
|---|---|---|---|
| 2,704,440 | 3/1955 | Nicholson | 60/752 |
| 2,780,060 | 2/1957 | Griffith | 60/752 |
| 3,018,624 | 1/1962 | Bonsall et al. | 60/752 |
| 3,433,015 | 3/1964 | Sneeden | 60/738 |
| 3,608,310 | 9/1971 | Yaught | 60/752 |

FOREIGN PATENT DOCUMENTS

| | | | |
|---|---|---|---|
| 853108 | 11/1960 | United Kingdom | 60/745 |
| 917704 | 2/1963 | United Kingdom | 60/745 |
| 980363 | 1/1965 | United Kingdom . | |
| 1193587 | 6/1970 | United Kingdom | 60/39.75 |

Primary Examiner—Carlton R. Croyle
Assistant Examiner—T. S. Thorpe
Attorney, Agent, or Firm—Francis L. Conte; Derek P. Lawrence

[57] ABSTRACT

Means are provided for controlling and modulating the temperature of the hot gas exiting the combustor associated with a gas turbine engine. The means establish a preselected temperature gradient in the hot gas so as to provide a flow of hot gas at a relatively higher temperature through gaps between adjacent turbine vanes and a flow of hot gas at a relatively lower temperature upon the vanes.

4 Claims, 3 Drawing Figures

U.S. Patent    Mar. 29, 1988    4,733,538
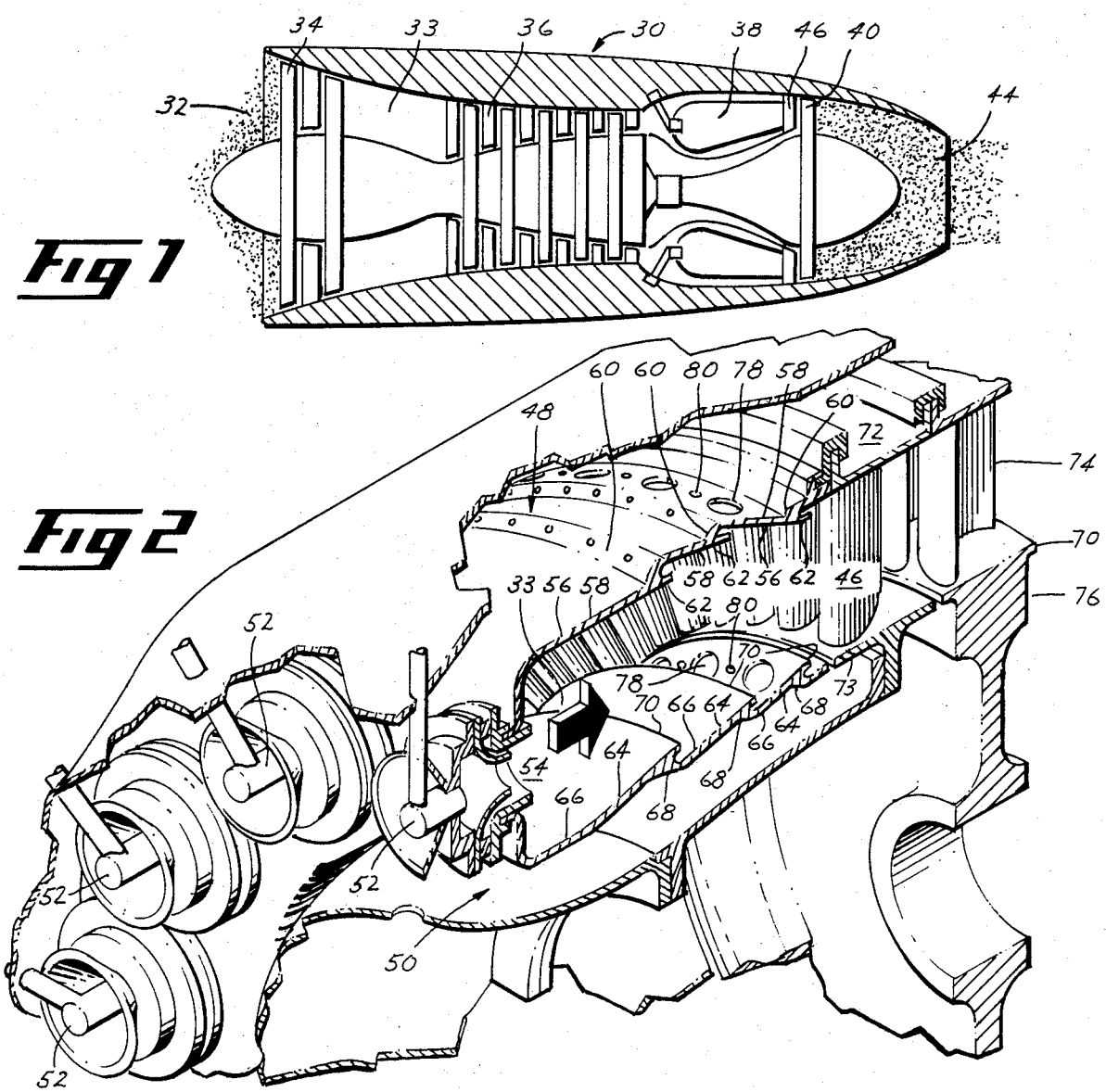
Fig 1
Fig 2
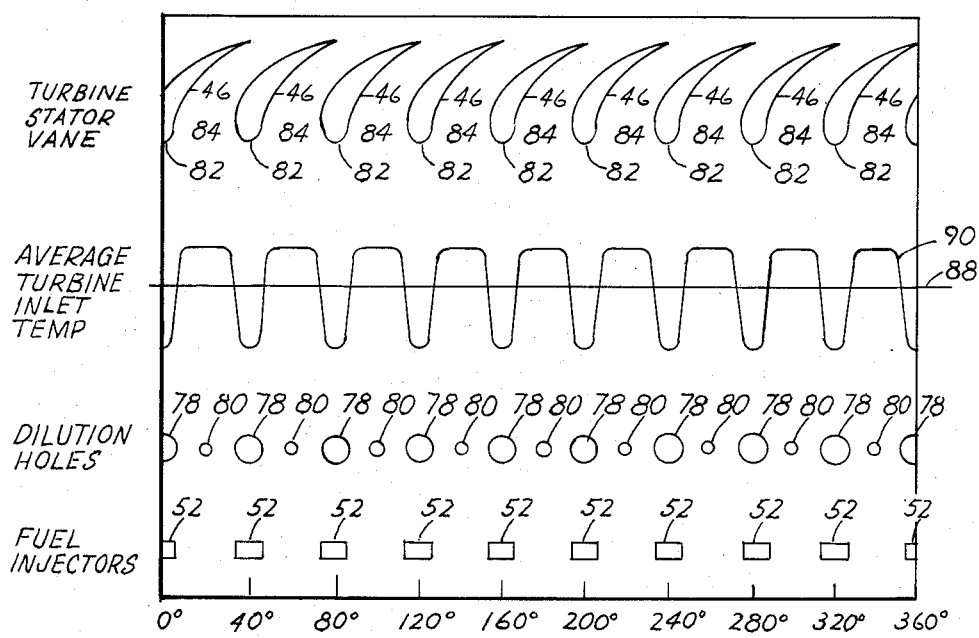
Fig 3

COMBUSTION SELECTIVE TEMPERATURE DILUTION

CROSS-REFERENCE TO RELATED APPLICATION

This application is a continuation-in-part of another patent application, Ser. No, 947,919, filed Oct. 2, 1978, now abandoned.

BACKGROUND OF THE INVENTION

This invention relates to a gas turbine engine and more particularly to the control and modulation of the temperature of the hot gas stream exiting the combustor associated with the engine.

Present day gas turbine engines employed as aircraft power plants operate at high gas temperatures. In fact, one of the key performance factors indicative of the thrust of the engine is combustor exit temperature. To attain and maintain a certain rated thrust, the hot gases exiting the combustor must exhibit a certain average gas temperature level which is typically the highest average gas temperature encountered in the engine. In many instances, this temperature level approaches the temperature limit of the components such as turbine stator vanes, disposed at the combustor exit. Consequently, designers are faced with achieving compatibility between the turbine vanes and the high average temperature of the hot gases exiting the combustor.

Non-uniformity of the temperature of the hot gases in the combustor exit plane is an additional factor which makes the designers dilemma even more acute. The temperature non-uniformities are generally resultant from the geometrical design of the combustor itself. By way of example, the fuel injectors of the combustor contribute to a non-uniform exit temperature distribution in the form of localized temperatures in the plane significantly higher than the average temperature. Specifically, during the combustion process, burning of the air/fuel mixture tends to occur more intensely at the points in the combustor where fuel is injected. Since the airflow through the combustor is at a high velocity, these areas of intense combustion are elongated into hot streaks extending axially along the length of the combustor. In many instances hot streaks may extend axially in the aft direction so far as to encompass turbine stator vanes disposed downstream of the exit of the combustor. Hence, while it is generally correct to say that the designer must design to the average temperature of the hot gases at the exit plane of the combustor, the designer must in fact design the turbine stator vanes to be compatible with the highest single point temperatures of the hot gases at the exit plane. The single point temperatures are hence a significant problem for the designer who has typically responded by applying state of the art cooling techniques. Specifically, the standard approaches have included film cooling of the surfaces of the vane or providing for impingement and internal convection cooling of the vane using compressor discharge air. Use of cooling air in this manner, however, is accompanied by performance decreases in the engine in the form of reduced thrust or greater fuel consumption per unit of thrust output. Furthermore, since the cooling air is introduced in these prior art devices at locations wherein the gases exhibit a high Mach number, mixing losses are high. Additionally, vane designs which utilize cooling techniques, such as impingement, are of complex construction and are high cost components in modern turbine engines.

The degree of non-uniformity of the temperature distribution of the gases at the exit plane of the combustor is highly dependent on the length allowed for combustion. Short combustors tend to produce higher streak temperatures due to inadequate mixing length. Prior art engines hence utilize longer combustors to eliminate the effects of the non-uniformity of the temperature distribution. The present invention is directed at providing a preselected circumferential temperation distribution of the hot gases at the combustor exit plane which reduces the required vane cooling air flows, simplifies the vane mechanical construction, and allows a short combustor design.

Therefore, it is an object of the present invention to achieve compatibility of the turbine stator vanes associated with a gas turbine engine and the hot gases exiting the engine combustor.

It is another object of the present invention to provide for compatibility of the turbine stator vanes and the hot gases exiting the engine combustor without adversely affecting the performance of the engine.

It is still another object of the present invention to eliminate the detrimental effects of a non-uniform temperature distribution of the hot gases exiting the engine combustor upon the turbine stator vanes.

It is yet another object of the present invention to impart a preselected temperature distribution to the hot gases exiting from a foreshortened combustor which distribution is favorable to cooling the turbine stator vanes during engine operation.

Briefly stated, the above and other related objects of the present invention, which will become apparent from the following specification and appended drawings, are accomplished by the present invention which provides, in one form, a gas turbine engine having a hot gas flowing in an annular path partially defined by inner and outer vane shrouds wherein the improvement comprises means disposed upstream of turbine vanes associated with the combustor for establishing a preselected circumferential temperature gradient in the hot gas. The gradient is preselected whereby hot gas at a relatively higher temperature flows through gaps between the vanes and hot gas at a lower temperature flows upon the vanes. The gradient may be established by providing means for admitting air into the combustor of the engine in the form of first and second pluralities of apertures. The first plurality generally provides a locally higher volume of dilution airflow than the second. This first plurality is axially aligned with the turbine vanes, while the second plurality is axially aligned with the aforementioned gaps. Additionally, the first plurality is located axially in a secondary zone of the combustor, but sufficiently upstream of the vanes to induce partial mixing of the dilution air with the hot gases before the partially mixed dilution air impinges upon the vanes. With this axial location the relatively lower gas temperatures of the gradient are present over the entire length of the vanes without using excessive amounts of dilution air. The sinusoidal characteristics of the invention are enhanced by using a number of vanes which are an exact multiple of the number of fuel injectors providing fuel to the engine.

DESCRIPTION OF THE DRAWINGS

While the specification concludes with a series of claims which particularly point out and distinctly claim the subject matter comprising the present invention a clear understanding of the invention will be readily obtained from the following description given in connection with the accompanying drawings in which:

FIG. 1 is a schematic representation of a typical gas turbine engine to which this invention applies.

FIG. 2 is a partial perspective enlarged view of the combustor and turbine sections of the engine depicted in FIG. 1.

FIG. 3 is a graphical representation depicting the relative circumferential position of elements comprising the present invention.

DESCRIPTION OF THE PREFERRED EMBODIMENT

Referring now to FIG. 1, a schematic view depicting a typical air breathing gas turbine engine is shown generally at 30 for the purpose of illustrating an application of the present invention. Engine 30 is comprised of inlet 32, booster assembly 34, compressor assembly 36, combustor assembly 38, turbine assembly 40 and exhaust 44 arranged in a serial flow relationship. An axiallly extending internal annular flow path 33 extends from inlet 32 aft to exhaust 44 and provides the flow path for air passing through the engine 30. A plurality of turbine stator vanes 46, comprising a portion of turbine assembly 40, are disposed in annular flow path 33 immediately downstream of combustor assembly 38. Ambient air entering inlet 32 is pressurized by booster 34 and compressor 36. The pressurized air enters combustor 38 where it is mixed with fuel and burned. The hot gases of combustion, which may in some gas turbine engines exceed 2500° F. exit combustor 38, flow thereafter past turbine stator vanes 46 and through the remaining portion of turbine assembly 40. Turbine assembly 40 extracts energy from the hot gases of combustion to drive booster 34 and compressor 36. The hot gases are thence expelled at a high velocity from the engine 30 through exhaust 44, whereby the energy remaining therein provides thrust generation by engine 30.

Referring now to FIG. 2, a perspective view of combustor assembly 38 is depicted in operative association with a plurality of turbine stator vanes 46, and the remaining portion of turbine assembly 40. Combustor assembly 38 is comprised of axially and circumferentially extending outer and inner liner assemblies 48 and 50, respectively, radially spaced from each other to define a portion of annular flow path 33 therebetween. Disposed at the upstream end of combustor liners 48 and 50, a plurality of fuel injectors 52 are mounted within a plurality of apertures 54 in combustor assembly 38. It should be observed that combustor assembly 38 exhibits a preferred annular configuration, extending circumferentially about the centerline of the engine. Accordingly, fuel injectors 52 are circumferentially spaced from each other to provide a number of injection points for admitting a fuel/air mixture to combustor assembly 38 over the circumferential extent of annular flow path 33.

Outer liner 48 is comprised of a plurality of integrally formed stepped hoops 56 each having a generally axially extending generally cylindrical portion 58 and an integral radially and circumferentially extending step portion 60 disposed at the downstream end thereof. Step portion 60 is integrally joined to the upstream end of the next adjacent downstream hoop 56. A lip portion 62 of the downstream end of each upstream hoop 56 partially underlaps the upstream end of the next adjacent downstream hoop 56, so as to provide means for film cooling the inner surfaces of liner 48.

Similarly inner liner 50 is formed of a plurality of integrally formed stepped hoops 64, each having a generally axially extending cylindrical portion 66 and an integral radially and circumferentially extending step portion 68 disposed at the downstream end thereof. Step portion 68 is integrally joined to the upstream end of the next adjacent downstream hoop 65. A lip portion 70 of the downstream end of each upstream hoop 64 partially underlaps the upstream end of the next adjacent downstream hoop 64 so as to provide means for film cooling the inner surface of liner 50.

The combustor assembly 38 is divided into primary and secondary combustion zones. The primary zone is basically defined as the region where primary combustion is occurring, meaning that almost all of the fuel that enters the combustor is burned in the combustive process in this primary zone. The secondary combustion zone is located downstream of the primary zone. In the secondary zone, some relatively minor amounts of fuel still undergo combustion, principally in local regions where there has been insufficient air to fully complete the combustion process. Any new air introduced as dilution air wil provide the necessary oxygen to complete the oxidation of any unburned gases so that some combustion will occur in the secondary zone.

The plurality of turbine stator or nozzle vanes 46 are disposed immediately downstream of the secondary zone of the combustor assembly 38 and are arranged to they are spaced apart from each other about the entire circumferential extent of combustor assembly 38. Vanes 46 are fixedly secured to inner and outer vane platforms or shrouds 72 and 73, respectively, which serve to further define the aforementioned flowpath 33. Immediately downstream of vanes 46, a plurality of circumferentially spaced apart turbine blades 74 are mounted on rotor disc 76 adapted for rotation. Blades 74 extract energy from the hot gas flowing past vanes 46.

Air admitting means in the form of first and second pluralities of circumferentially extending spaced apart dilution apertures 78 and 80, respectively, are disposed in each of inner and outer liners 48 and 50. Each aperature 80 is interspersed between the two adjacent apertures 78 and has a cross-sectional area less than the cross-sectional area of one of the apertures 78. Dilution apertures 78 and 80 both serve to admit additional air into combustor 38. This additional air mixes with the air/fuel mixture from injectors 52 and, to some extent, will promote some additional combustion.

The axial location of the larger dilution apertures 78 is quite significant. One design objective is to place the apertures sufficiently far downstream so as to be within the secondary combustion zone. A location within the secondary zone is desirable because a majority of the combustion process has already occurred in the primary zone. Therefore, the turbulence and oxidation associated with combustion is located upstream of the dilution apertures and the turbulence will have less effect on the dilution air as it enters the combustor. Because it is relatively unaffected, the dilution air will flow as a cool airmass more directly downstream and have more cooling effect on the vanes 46. Also, locating the dilution apertures 78 farther downstream means that dilution air can be directed to a region physically closer to the turbine vanes 46. The dilution air will thereby flow a shorter distance to the vanes 46 and only partially mix with the hot combustion gases. The close proximity to the vanes 46 permits the dilution air to impinge upon the vanes before completely mixing with the hot gases and this is an additional advantage that increases the cooling effect of the dilution air.

On the other hand, as a second design objective, the dilution apertures 78 must be placed far enough upstream of the vanes 46 so that the dilution air can flow radially between the combustor liners across the full length of the vane leading edges 82 before the dilution air is forced downstream past the vane leading edges by the hot gases. If the dilution apertures are located too close to the vanes 46, the dilution air won't be able to flow far enough in the radial direction, and the mid-section of the vanes will remain unaffected by the dilution air. Presumably, this problem could be avoided by using air injectors that would extend into the gas stream flowpath and inject large amounts of cooling air so as to "bathe" the vanes. However, this would require excessive amounts of cooling air, upset the gas flow pattern in a critical area, and cause a significant drain on engine performance. All of these factors must be considered in the combustor designer's decision on axial placement of the dilution apertures. As shown in FIG. 2, such a location for the first plurality and second plurality of apertures, can be the stepped hoop of each liner that is furthest downstream within the combustor.

With reference to FIG. 3, in accordance with the present invention, the circumferential position of apertures 78 and 80 with respect to turbine stator vanes 46 will now be described. FIG. 3 is a chart showing the axial alignment of dilution apertures 78 and 80 with respect to turbine vanes 46, which alignment comprises a portion of the present invention. The abscissa of the chart designates circumferential position about the centerline of the engine, while the ordinate generally depicts axial position along the centerline of the gas turbine engine with the position going from forward to aft as the chart is traversed from bottom to top. Hence it may be seen that leading edges 82 of turbine stator vanes 46 are circumferentially spaced approximately 40° apart from each other about the entire circumferential extent of the engine. It may also be observed that dilution apertures 78 are disposed in axial alignment with the leading edges 82 of turbine vanes 46. By way of example, at a circumferential position of 120°, a dilution aperture 78 is observed to be disposed in axial alignment with and immediately upstream of leading edge 82 of a vane 46. In each instance, then, the leading edge 82 of a vane 46 is preceded directly upstream by dilution aperture 78.

Dilution apertures 80, on the other hand, are disposed in axial alignment with gaps 84 located between adjacent leading edges 82 of adjacent vanes 46. Again by way of example, a dilution aperture 80 is in axial alignment with the gap 84 between the leading edge 82 positioned at 120° and the leading edge 82 positioned at 160°. This alignment sequence is repeated at the various circumferential positions about the centerline of the engine.

Average turbine inlet temperature 88 is also depicted schematically in FIG. 3 along with a continuous circumferential temperature profile curve 90, representing the temperature at various circumferentially spaced points in the inlet plane to the vanes 46. It is observed that, in accordance with the present invention, with apertures 78 and 80 axially-aligned with leading edges 82 and gaps 84, respectively, the temperature of the hot gases striking the vanes 46 is reduced below the average gas temperature 88, while the temperature of the hot gases flowing axially into the gaps 84 is in excess of the average gas temperature 88. That is to say, a preselected circumferential temperature gradient is established to provide a flow of hot gas at a relatively higher temperature through gaps 84 and a flow of hot gas at a relatively lower temperature upon vanes 46. This sinusoidal characteristic of the continuous temperature profile curve 90 arises from the fact that the dilution air admitted to the combustor is at a lower temperature than the burning air/fuel mixture and hence the air has cooling capability. Large apertures 78 admit greater quantities of air at locations in axial alignment with vanes 46 while smaller apertures 80 admit lesser quantities of air at locations in axial alignment with gaps 84. Larger apertures 78 introduce more cooling enhancement than smaller apertures 80. Hence, dilution apertures 78 which are larger in cross-sectional area, produce localized cool spots or streaks. By aligning these cool spots or streaks with the leading edges 82, advantage can be taken of cooling enhancement characteristics of the dilution air. More specifically, placement of the dilution apertures 78 and 80 as hereinbefore described permits the generation of a favorable circumferential temperature distribution or gradient of alternate high and low temperature zones. The high temperature zones are relegated to the gaps 84 between vanes 46 while the vanes 46 themselves are disposed within the low temperature zones. With apertures 78 and 80 disposed as hereinbefore described, the average turbine inlet temperature, which is a measure of available thrust of the engine, is maintained at the desired level since the gas flow at high temperature between vanes is compensated for by the gas flow at lower temperature. Hence, with the specific arrangement of dilution holes described above, the temperature of the hot gases at the leading edge of vanes 46 may be reduced without affecting the average temperature of the hot gases in the combustor exit annulus.

Another advantage of the arrangement described herein lies in the fact that localized hot spots or streaks produced by injectors 52, as mentioned above, cannot penetrate the lower temperature zones established ahead of leading edges 82. Furthermore, by using a number of vanes 46 which is an exact multiple of the number of fuel injectors 52, the sinusoidal characteristics of the continuous temperature curve 90 are reinforced. Such an arrangement permits a specified alignment sequence to be repeated throughout the circumferential extent of the engine. Hence, the temperature zone control will be promoted.

The apparatus hereinbefore described is well adapted to fulfill the stated objects of the invention. The random nature of the temperature gradients which have heretofore been present in prior art devices has been eliminated. In accordance with the present invention, the random temperature gradient is replaced with an order or preselected temperature gradient wherein the hot portions of the gas flow is relegated to flow into gaps between vanes. This is accomplished by management of already present dilution air used to promote the combustion process. The present invention does not require additional cooling air or elaborate vane cooling designs as do prior art devices. Hence, the present invention provides a significant advantage over devices heretofore known in the art.

While the preferred embodiment of our invention has been described fully in order to explain its principles, it is understood that various modifications or alterations may be made to the preferred embodiment without departing from the scope of the invention as set forth in the appended claims.

We claim:

1. In a gas turbine engine having a hot gas flowing in an annular path partially defined by inner and outer liners of a combustor and inner and outer vane shrouds, said combustor including at its upstream end a plurality of injectors for admitting an original mixture of air and fuel to the upstream end of said combustor for burning of said mixture in said combustor, the improvement comprising:

a plurality of circumferentially spaced-apart stationary turbine vanes disposed in said hot gas flow path downstream of said combustor, each of said vanes extending radially across said hot gas flow path, the spacing between said vanes forming a gap therebetween;

a first plurality of circumferentially spaced-apart dilution apertures disposed in said combustor downstream of said injectors, upstream of said turbine vanes and in axial alignment with leading edges of said turbine vanes, for admitting dilution air into said combustor for mixing with said original mixture to promote partial mixing thereof; and a second plurality of circumferentially spaced dilution apertures for admitting dilution air into said combustor to promote partial mixing with the original mixture, each of said second apertures being smaller in size than said first apertures and each being disposed equidistantly between adjacent ones of said first apertures and in circumferential alignment therewith and in axial alignment with gaps between said vanes;

said first and second apertures being axially located in a secondary combustion zone of said combustor and upstream of said turbine vanes to induce partial mixing of said dilution air with said hot gases for generating a preselected circumferential temperature gradient in said hot gas for providing a flow of hot gas at a relatively higher temperature through said gaps and a flow of hot gas at relatively lower temperature upon said turbine vanes; said first and second apertures terminating at substantially an inner surface of said combustor and being located upstream of said vanes at a position such that dilution air from said first apertures flows over a full length of said leading edges of said vanes.

2. The invention as set forth in claim 1 wherein the inner and outer liners of said combustor are comprised of stepped hoops and said first and second plurality of apertures of each respective liner are located on the stepped hoop that is furthest downstream within said combustor.

3. The invention as set forth in claim 1 further comprising:

a plurality of fuel injectors spaced about the circumferential extent of said combustor, the number of said vanes being an exact multiple of the number of said fuel injectors.

4. The invention as set forth in claim 3 wherein the number of said vanes is equal to the number of said fuel injectors.

* * * * *